United States Patent [19]

Conciatori et al.

[11] 4,452,967

[45] Jun. 5, 1984

[54] HIGH MOLECULAR WEIGHT POLYBENZIMIDAZOLE PREPARATION WITH PHOSPHORUS CONTAINING CATALYST

[75] Inventors: Anthony B. Conciatori, Chatham; Eui W. Choe, Randolph, both of N.J.; Henry K. Hall, Jr., Tucson, Ariz.

[73] Assignee: Celanese Corporation, New York, N.Y.

[21] Appl. No.: 506,543

[22] Filed: Jun. 21, 1983

Related U.S. Application Data

[62] Division of Ser. No. 381,285, May 24, 1982, Pat. No. 4,414,383.

[51] Int. Cl.$^3$ ............................................. C08G 73/18
[52] U.S. Cl. ................................... 528/207; 528/208; 528/313; 528/331
[58] Field of Search ............... 528/313, 331, 207, 208

[56] References Cited

U.S. PATENT DOCUMENTS 4,312,976  1/1982  Choe ................................... 528/313
4,394,500  7/1983  Milford ............................... 528/313

*Primary Examiner*—Harold D. Anderson
*Attorney, Agent, or Firm*—Depaoli & O'Brien

[57] ABSTRACT

This invention provides a single stage melt polymerization process for the production of an improved type of high molecular weight polybenzimidazole, which involves the use of a phosphorus-containing polymerization catalyst.

The process provides poly-2,2'-(m-phenylene)-5,5'-bibenzimidazole of improved color and plugging value, and is further characterized by an inherent viscosity of at least about 0.7 dl/g, and a weight average molecular weight of at least about 100,000.

2 Claims, No Drawings

HIGH MOLECULAR WEIGHT POLYBENZIMIDAZOLE PREPARATION WITH PHOSPHORUS CONTAINING CATALYST

This is a division of application Ser. No. 381,285 filed May 24, 1982, now U.S. Pat. No. 4,414,383.

BACKGROUND OF THE INVENTION

U.S. Pat. No. Re. 26,065 describes a method of preparing high molecular weight aromatic polybenzimidazoles by melt polymerizing an aromatic tetraamine and a diphenyl ester or an anhydride of an aromatic dicarboxylic acid at an elevated temperature and thereafter further polymerizing the product of the melt polymerization in the solid state. According to this process, in order to produce polymers of sufficiently high molecular weight to be suitable for practical use it is necessary to finely pulverize the product of the melt polymerization prior to polymerization in the solid state and to conduct the solid state polymerization at an elevated temperature under a reduced pressure of less than 0.5 mm Hg or at an elevated temperature and in an inert gas stream over a prolonged period of time. Thus, the process requires several complicated operations. In addition, since the reaction is conducted over a long period of time at an elevated temperature, it tends to form insoluble and infusible polymers.

U.S. Pat. No. 3,313,783 describes a process adapted to overcome the above-mentioned deficiencies which process involves the solution polymerization of an inorganic acid salt of an aromatic tetraamine and a dicarboxylic acid or a derivative thereof with heat in polyphosphoric acid. After completion of the reaction the polymer product is separated by pouring the reaction mixture in the form of a polyphosphoric acid solution into a large quantity of water. However, this separation procedure is complicated and it is difficult to recover and reuse the polyphosphoric acid. Thus, this process is not generally considered satisfactory for the commercial production of polybenzimidazoles.

Another process for producing polybenzimidazoles is described in U.S. Pat. No. 3,509,108. In the process the monomers are initially reacted in a melt phase polymerization at a temperature above 200° C. and a pressure above 50 psi. The reaction product is then heated in a solid state polymerization at a temperature above 300° C. to yield the final aromatic polybenzimidazole product. The process requires that the initial reaction be conducted at a pressure above 50 psi (preferably, between 300–600 psi) in order to control the foaming encountered during the polymerization.

U.S. Pat. No. 3,555,389 describes a two stage process for the production of aromatic polybenzimidazoles. The monomers are heated at a temperature above 170° C. in a first stage melt polymerization zone until a foamed prepolymer is formed. The foamed prepolymer is cooled, pulverized, and introduced into a second stage polymerization zone where it is heated in the presence of phenol to yield a polybenzimidazole polymer product. As with the process of U.S. Pat. No. Re. 26,065, this process involves multiple operations and tends to form insoluble polymers.

U.S. Pat. No. 3,433,772 describes a two stage polymerization process for the production of aromatic polybenzimidazoles which utilize an organic additive, such as an alkane having 11–18 carbon atoms or a polycarboxylic hydrocarbon, in order to control foaming during the first stage.

U.S. Pat. No. 3,655,632 describes a melt polymerization process for the production of high molecular weight aromatic polybenzimidazoles. The process involves heating a mixture of an aromatic tetraamine and an aromatic dinitrile in the presence of an ammonium salt of an inorganic acid or an organic sulfonic acid. The patent states (column 1, lines 27–32) that generally it is considered impossible to obtain aromatic polybenzimidazoles, especially of high molecular weight, by merely heating a mixture of aromatic tetraamines and aromatic dicarboxylic acids or derivatives thereof.

U.S. Pat. No. 3,784,517 describes a one-step process for preparing polybenzimidazoles that involves reacting an aromatic tetraamino compound with the diphenyl ester or anhydride of an aromatic dicarboxylic acid in the presence of an aliphatic or aromatic sulfone solvent.

U.S. Pat. No. 4,312,976 describes a single stage melt polymerization process for producing polybenzimidazole which involves reacting a tetraaminobiphenyl with a dicarboxylic acid in the presence of an acid catalyst such as p-toluenesulfonic acid.

Technical Report AFML-TR-73-22 (Air Force Material Laboratory, Wright-Patterson AFB, Ohio) describes the production of polybenzimidazole from tetraaminobiphenyl and diphenyl isophthalate in the presence of various catalysts such as ammonium chloride, hydrochloric acid, p-toluenesulfonic acid, phosphoric acid, triphenylphosphate and boron trifluorideetherate.

There remains a need for an improved method of producing polybenzimidazole which overcomes the various disadvantages of the prior art procedures, and which method yields an improved type of polybenzimidazole product particularly suitable for the formation of fibers having a high melting point and a high degree of thermal stability.

Accordingly, it is an object of this invention to provide a single stage melt polymerization process for the production of high molecular weight polybenzimidazole which is conducted in the absence of a solvent or antifoaming agent, and which does not yield any organic byproduct.

It is another object of this invention to provide a novel type of high molecular weight polybenzimidazole which is characterized by an improved plugging value and an improved color specification.

Other objects and advantages of the present invention shall become apparent from the accompanying description and examples.

DESCRIPTION OF THE INVENTION

One or more objects of the present invention are accomplished by the provision of a single stage melt polymerization process for the production of high molecular weight polybenzimidazole which comprises preparing a mixture of (1) at least one aromatic tetraamine containing two groups of amine substituents, said amine substituents in each group being in an ortho position relative to each other, and (2) at least one dicarboxylic acid; and heating the mixture above its melting temperature in the presence of a phosphorus-containing polymerization catalyst corresponding to the formula:

where R is a radical selected from organic, halide and hydrogen substituents, with the proviso that not more than one R is hydrogen; and Y is an oxygen atom, and n is the integer zero or one.

In a further embodiment, the present invention provides a single stage melt polymerization process for the production of high molecular weight polybenzimidazole which comprises polymerizing at least one monomeric aromatic compound having a pair of amine substituents in an ortho position relative to each other and a carboxylic acid group positioned on an aromatic nucleus, by heating the monomer above its melting temperature in the presence of a phosphorus-containing polymerization catalyst corresponding to the formula:

where R is a radical selected from organic, halide and hydrogen substituents, with the proviso that not more than one R is hydrogen; and Y is an oxygen atom, and n is the integer zero or one.

Polybenzimidazoles are a known class of heterocyclic polymers which consist essentially of recurring units of the following Formulas I and II. Formula I is:

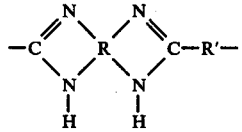

where R is a tetravalent aromatic nucleus with the nitrogen atoms forming the benzimidazole rings being paired upon adjacent carbon atoms, i.e., ortho carbon atoms, of the aromatic nucleus, and R' is a member of the class consisting of an aromatic ring; an alkylene group (preferably having 4 to 8 carbon atoms); and a heterocyclic ring such as pyridine, pyrazine, furan, quinoline, thiophene, and pyran.

Formula II is:

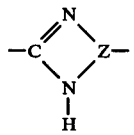

where Z is an aromatic nucleus having the nitrogen atoms forming the benzimidazole ring paired upon adjacent carbon atoms of the aromatic nucleus.

Any of the above polybenzimidazoles represented by the Formulas I and II can be prepared by the process of the present invention.

The following generalized equation illustrates the condensation reaction which occurs in forming the polybenzimidazoles having the recurring units of Formula I:

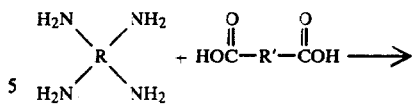

Such polybenzimidazoles are produced by the reaction of a mixture of (1) at least one aromatic tetraamine containing two groups of amine substituents, the amine substituents in each group being in an ortho position relative to each other, and (2) at least one dicarboxylic acid.

It is advantageous to use as the aromatic tetraamines compounds such as those illustrated below:

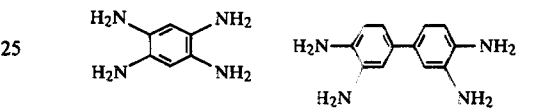

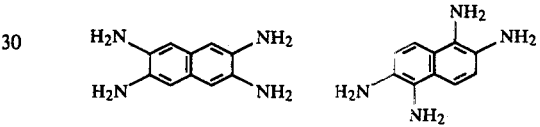

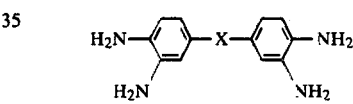

where X represents —O—, —S—, —SO$_2$—,

or a lower alkyl group, such as —CH$_2$—, —(CH$_2$)$_2$—, or —C(CH$_3$)$_2$—. Such aromatic tetraamines include 1,2,4,5-tetraaminobenzene; 1,2,5,6-tetraaminonaphthalene; 2,3,6,7-tetraaminonaphthalene; 3,3',4,4'-tetraaminodiphenyl ether; 3,3',4,4'-tetraaminobiphenyl; 3,3',4,4'-tetraaminodiphenylmethane; 3,3',4,4'-tetraamino-1,2-diphenylethane; 3,3',4,4'-tetraamino-2,2-diphenylpropane; 3,3',4,4'-tetraaminodiphenylthioether; and 3,3',4,4'-tetraaminodiphenylsulfone. The preferred aromatic tetraamine is 3,3',4,4'-tetraaminobiphenyl.

The dicarboxylic acids which are suitable for use in the production of polybenzimidazoles by the process of the present invention include aromatic dicarboxylic acids; aliphatic dicarboxylic acids (preferably, those having 4 to 8 carbon atoms); and heterocyclic dicarboxylic acids wherein the carboxyl groups are substituents upon carbon atoms in a ring compound such as pyridine, pyrazine, furan, quinoline, thiophene, and pyran.

The preferred dicarboxylic acids are aromatic dicarboxylic acids such as those illustrated below:

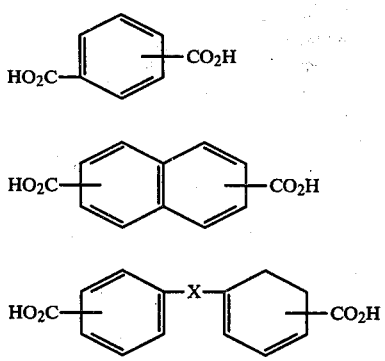

where X is as defined above. Typical dicarboxylic acids include terephthalic acid; isophthalic acid; 4,4'-biphenyldicarboxylic acid; 1,4-naphthalenedicarboxylic acid; 1,6-naphthalenedicarboxylic acid; 2,6-naphthalenedicarboxylic acid; 4,4'-diphenyletherdicarboxylic acid; 4,4'-diphenylmethanedicarboxylic acid; 4,4'-diphenylsulfonedicarboxylic acid; and 4,4'-diphenylthioetherdicarboxylic acid. Isophthalic acid is the preferred dicarboxylic acid for use in the present invention process.

It is preferred to employ the dicarboxylic acid in a ratio of about 1 mole per mole of aromatic tetramine. However, in order to obtain a product having an optimum molecular weight, it can be advantageous to employ an excess (e.g., 0.25 mole percent) of either the dicarboxylic acid or the tetraamine monomeric reactant.

Examples of polybenzimidazoles which have the recurring structure of Formula I and which may be prepared according to the process of the present invention include:
poly-2,2'-(m-phenylene)-5,5'-bibenzimidazole;
poly-2,2'-(pyridylene-3",5")-5,5'-bibenzimidazole;
poly-2,2'-(furylene-2",5")-5,5'-bibenzimidazole;
poly-2,2'-(naphthalene-1",6")-5,5'-bibenzimidazole;
poly-2,2'-(biphenylene-4",4''')-5,5'-bibenzimidazole;
poly-2,2'-amylene-5,5'-bibenzimidazole;
poly-2,2'-octamethylene-5,5'-bibenzimidazole;
poly-2,6-(m-phenylene)-diimidazobenzene;
poly-2,2'-cyclohexenyl-5,5'-bibenzimidazole;
poly-2,2'-(m-phenylene)-5,5'-di(benzimidazole)ether;
poly-2,2'-(m-phenylene)-5,5'-di(benzimidazole)sulfide;
poly-2,2'-(m-phenylene)-5,5'-di(benzimidazole)sulfone;
poly-2,2'-(m-phenylene)-5,5'-di(benzimidazole)methane;
poly-2',2"-(m-phenylene)-5',5"-di(benzimidazole)propane-2,2; and
poly-2,2'-(m-phenylene)-5',5"-di(benzimidazole)ethylene-1,2.

The preferred polybenzimidazole of Formula I prepared by the process of the present invention is poly-2,2'-(m-phenylene)-5,5'-bibenzimidazole as characterized by the recurring unit:

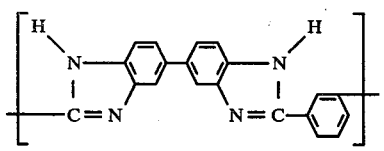

The illustrated polymer can be prepared in accordance with the present invention process by the reaction of 3,3',4,4'-tetraaminobiphenyl with isophthalic acid.

The polybenzimidazoles having the recurring units of Formula II can be prepared by the autocondensation of at least one aromatic compound having a pair of amine substituents in an ortho position relative to each other and a carboxylic acid group positioned upon an aromatic nucleus (referred to hereinafter as the diaminocarboxylic acid reactant). Examples of such compounds include 3,4-diaminobenzoic acid; 5,6-diaminonaphthalene-1-carboxylic acid; 5,6-diaminonaphthalene-2-carboxylic acid; 6,7-diaminonaphthalene-1-carboxylic acid; 6,7-diaminonaphthalene-2-carboxylic acid, and the like. A preferred compound is 4-carboxy-3',4'-diaminodiphenyl ether:

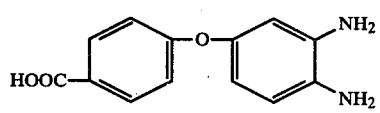

According to the present invention process, high molecular weight polybenzimidazole is produced by reacting the monomeric reactant or reactants described above. The preferred reactants are a mixture of at least one aromatic tetraamine and at least one dicarboxylic acid, as defined above, with 3,3',4,4'-tetraaminobiphenyl and isophthalic acid being especially preferred. The monomeric reactant or reactants are reacted at a temperature above the melting temperature of the monomeric reactant or reactants. When a mixture of at least one aromatic tetraamine and at least one dicarboxylic acid is employed, the melting temperature of the mixture is approximately the melting point of the dicarboxylic acid.

The melt polymerization process of the present invention usually is conducted at a temperature of at least about 340° C., and preferably at a temperature within the range between about 340°–450° C. In a typical embodiment, the process is conducted at a temperature within the range of about 380°–430° C.

The process normally employs a pressure between about 15–40 psi, and preferably the process is conducted at atmospheric pressure. In a typical run an open polymerization system is used which is provided with a distillation column to remove the water which is produced as a byproduct of the condensation-polymerization reaction.

In the case of autocondensation reactions employing a diaminocarboxylic acid reactant as defined above, it may be desirable to employ pressures slightly above atmospheric pressure (e.g., up to approximately 2 atmospheres). The higher pressures are utilized to prevent sublimation of diaminocarboxylic acid reactant. One method of obtaining the higher pressures is to allow the water byproduct formed during the reaction to accumulate in the reaction system until the desired pressure is attained.

The reaction is conducted in a substantially oxygen-free atmosphere. For example, an inert gas such as nitrogen or argon can be continuously passed through the reaction zone during the polymerization. The inert gas employed should be substantially oxygen-free, i.e., it should contain less than about 8 ppm of molecular oxygen. The inert gas is introduced into the reaction zone at a rate of flow measured at standard conditions, i.e., atmospheric pressure and temperature, within the range of about 1–200 percent of the volume of the reaction zone per minute. The inert gas can be passed into the polymerization reaction zone at room temperature or it can be preheated to the reaction temperature.

The melt polymerization process is conducted for a period of time sufficient to produce a high molecular weight polybenzimidazole product. The inherent viscosity of the polybenzimidazole product is an indication of its molecular weight. The high molecular weight polybenzimidazoles produced by the process of the present invention exhibit an inherent viscosity of at least approximately 0.6 dl/g when measured at a concentration of 0.4 g of the polymer in 100 ml of 97 percent $H_2SO_4$ at 25° C. Preferably, the polymer exhibits an inherent viscosity of at least approximately 0.7 dl/g. In order to obtain a high molecular weight polybenzimidazole product, the polymerization is conducted for a reaction period of at least about one hour, e.g., a reaction period between about 1–10 hours.

The monomeric reactant or reactants in the presence of the polymerization catalyst can be heated to the polymerization temperature either by a single heating or by a step-wise heating process. Especially at the high polymerization temperatures, it is sometimes desirable to employ a step-wise heating process in order to minimize the possibility of monomer decomposition. For example, the monomeric reactant or reactants can be heated initially to a temperature slightly greater than the melting temperature of the reaction mixture. The temperature of the reaction mixture can then be raised at intervals within the range of approximately 20°–50° C. until the desired polymerization temperature and degree of polymerization are attained. The reaction mixture can be maintained at each temperature of the step-wise procedure for a period of time within the range of approximately 0.1–3 hours, e.g., about 1.5 hours.

The polymerization catalyst is employed in a quantity between about 0.01–2 weight percent, based on the total weight of monomeric material being reacted. In a typical polymerization reaction the weight of polymerization catalyst employed is in the range between about 0.1–1.0 percent, based on the total weight of monomeric material.

An important aspect of the present invention is the use of a specific class of phosphorus-containing polymerization catalysts. Among the phosphorus-containing compounds corresponding to the formula presented hereinabove are organophosphines, organophosphites, organophosphates, and corresponding halide-substituted derivatives.

The organic radicals in the phosphorus-containing compounds include aliphatic, alicyclic and aromatic substituents and the corresponding oxyphosphorus linked substituents such as are characteristic of organophosphite compounds. The etheric groups in organophosphites are considered to be derived from the corresponding phosphorous acid compound.

The preferred species of phosphorus-containing polymerization catalysts generally include compounds corresponding to the previously described formula in which the R radicals are selected from hydrogen and halide (e.g., chloride and bromide) substituents, and hydrocarbyl and hydrocarbyloxy substituents containing between about 1–18 carbon atoms per substituent, and the "hydrocarbyl" substituents can contain noninterfering heteroatoms such as oxygen, sulfur, nitrogen and halogen. The R substituents can be either the same or different groups. A present invention polymerization catalyst can also contain more than one phosphorus atom, e.g., as in di-1,2-(diethylphosphinyl)ethane.

Illustrative of phosphorus-containing compounds suitable as catalysts for the melt polymerization process of the present invention are trimethylphosphine, trihexylphosphine, tridecylphosphine, diethylhexylphosphine, triphenylphosphine, tritolylphosphine, tri(p-methoxyphenyl)phosphine, tricyclopentylphosphine, dicyclohexylmethylphosphine, phenyldiethylphosphine, diphenylbenzylphosphine, phenyldichlorophosphine, trimethylphosphite, butyldiethylphosphite, tridodecylphosphite, triphenylphosphite, trinaphthylphosphite, phenyl diphenylphosphinite, diphenyl phenylphosphonite, tri(p-chlorophenyl)phosphite, tri(p-cyanophenyl)phosphite, 8-phosphabicyclo[3.2.1]octane, triphenylphosphate, triethylphosphate, phosphorus trichloride, phosphorusoxytribromide, o-phenylenephosphochoridite, phosphenyl chloride, diphenylphosphine oxide, and the like.

Phosphorus-containing compounds of the type described above generally can be purchased, or they can be prepared by various synthesis methods such as that described in U.S. Pat. No. 4,312,818.

An important advantage derived from the practice of the present invention melt polymerization process is the provision of a high molecular weight polybenimidazole which has a novel combination of desirable properties. Thus, in another embodiment the present invention provides polybenzimidazole which is characterized by properties comprising an Inherent Viscosity of at least about 0.7 dl/g when measured at a concentration of 0.4 g of said polybenzimidazole in 100 ml of 97 percent sulfuric acid at 25° C.; a Weight Average Molecular Weight of at least about 100,000; a Plugging Value of greater than about 0.5; a Gardner Color of less than about 10; and which polybenzimidazole is capable of forming a 15 weight percent solution when heated at 240° C. for two hours in dimethylacetamide solvent containing 2 weight percent of lithium chloride.

Polybenzimidazole (PBI) molecular weight constants referred to herein are determined by employing a Waters 201 instrument with two porous silica columns (Waters μ-Bondagel E-linears) at the concentration of 0.2 g wt/vol in DMAc containing 2% LiCl. The calculations are based on a calibration curve obtained with eleven polystyrene molecular weight standards with the range between 2100 and 1,800,000, and the PBI molecular weight corresponds to the polystyrene equivalent molecular weight.

Number Average Molecular Weight ($\overline{Mn}$) and Weight Average Molecular Weight ($\overline{Mw}$) and Molecular Weight Distribution are related as follows:

$$MWD = \overline{Mw}/\overline{Mn}$$

The double logarithm of Intrinsic Viscosity (97% $H_2SO_4$) versus Weight Average Molecular Weight (DMAc, 2% LiCl) can be plotted, and the Mark-Houwink equation for PBI molecular weight can be derived from the plot and expressed as $$[\eta]_{H_2SO_4} = 1.35326 \times 10^{-4} M^{0.73287}$$

The relationship of intrinsic viscosity to inherent viscosity of PBI in 97% sulfuric acid can be expressed as:

$$[\eta] = 1.0585 \cdot \eta_{inh}$$

By using these expressions, the molecular weight of PBI polymers can be estimated from intrinsic or inherent viscosities in a reasonable agreement with the experimental values.

Plugging Value (P.V.) referred to herein is a measure of solution filterability, and is determined from the filtration rate through a fine filter paper. The PBI polymer to be evaluated is dissolved in 97.0±0.1% sulfuric acid at a known concentration of 5 to 7%. The solution is prepared by weighing the desired quantity of sulfuric acid (e.g., 95 grams) into a 250 ml glass-stoppered erlenmeyer flask, and then weighing the desired quantity of polymer (e.g., 5 grams) with the flask. The polymer is dissolved by shaking on a wrist-action shaker for a minimum of two to three days depending upon the Intrinsic Viscosity (I.V.) level (i.e., longer for higher I.V.'s). The filtration apparatus consists of a 2" stainless steel pressure filter (Gelman Instrument Co.), Model 4240, and Gelman Type A, 2" glass filter papers. The solution after shaking is poured into the filter chamber and one atmosphere of pressure from a nitrogen cylinder is applied. Zero time is taken as the first drop reaches the receiver located on a balance below the filtration unit. The weight of the solution that passes through the filter is recorded with respect to time. Data is continuously generated until either the filter is emptied or the filtration rate is very slow as a result of plugging.

Calculation of the Plugging Value is as follows:

1. Each time in minutes is divided by the corresponding weight in grams of solution (total) through the filter at that time.
2. The obtained values are plotted against time. The resulting graph approximates a straight line. The initial curvature is disregarded as well as the last few points if curvature would again exist.
3. The reciprocal slope of the graph represents the theoretical weight in grams of solution that would pass through the filter in infinite time in order to plug it. This is designated as $W_\infty$.

$$P.V. = \frac{W_\infty \times \text{Concentration}}{\text{Filter Area}}$$

Polybenzimidazole Gardner Color referred to herein is a value which is determined relative to the Gardner Color scale (Gardner Laboratory Inc., Bethesda, Md.).

The Gardner Color scale consists of a gradation of twenty color shades ranging from water-white(1) to dark brown(20). In accordance with the present invention, polybenzimidazole is provided which has a Gardner Color of less than about 10. A typical commercial type polybenzimidazole fiber has a Gardner Color of about 14.

The following Examples are further illustrative of the present invention. The reactants and other specific ingredients and conditions are presented as being typical, and various modifications can be devised in view of the foregoing disclosure within the scope of the invention.

EXAMPLE I

A.

Into a 3-necked flask equipped with a nitrogen inlet and outlet, a mechanical stirrer, and a condenser were placed 56.35 g (0.263 moles of 3,3′,4,4′-tetraaminobiphenyl, 43.69 g (0.263 moles) of isophthalic acid, and 0.6 g of triphenylphosphite. The flask was degassed and then filled with nitrogen. The mixture was heated rapidly with stirring for a period of approximately one hour to a temperature (i.e., 415° C.) as designated in the specific runs. A 17 ml quantity of water was collected. The temperature of the reaction mixture was maintained at 415° C. for another hour.

The resulting product was cooled to room temperature to provide a quantitative yield of the polybenzimidazole. The polybenzimidazole exhibited an inherent viscosity of 0.77 dl/g when measured in a concentration of 0.4 g of the polybenzimidazole in 100 ml of 97 percent sulfuric acid. The weight average molecular weight was 140,000 with a molecular weight distribution of 2.69. The polymer was completely soluble in dimethylacetamide containing 2% lithium chloride.

A reverse osmosis membrane prepared from this polymer in dimethylacetamide containing 2% lithium chloride at 21% polymer solids had a flux property of 20.1 gallons/ft$^2$/day and a salt rejection of 91.65%.

B.

The procedure of Run A was repeated except that the amount of catalyst was 0.4 grams. The inherent viscosity of the polybenzimidazole thus produced was 0.72 dl/g when measured in a concentration of 0.4 g of the polybenzimidazole in 100 ml of 97 percent sulfuric acid at 25° C. The polymer was completely soluble in dimethylacetamide containing 2% lithium chloride. The weight average molecular weight and molecular weight distribution were 127,000 and 2.47, respectively.

C.

The procedure of Run A was repeated except that after heating the reaction mixture to its melting temperature the polymerization temperature was raised to 430° C. and held at that temperature for one hour. The inherent viscosity of the polybenzimidazole thus produced was 0.85 dl/g when measured in a concentration of 0.4 g of the polybenzimidazole in 100 ml of 97 percent sulfuric acid at 25° C. The weight average molecular weight and molecular weight distribution were 144,000 and 2.58, respectively. The polymer was completely soluble in dimethylacetamide containing 2% lithium chloride.

D.

The procedure of Run C was repeated except that the amount of catalyst was 0.8 grams. The inherent viscosity of the polybenzimidazole thus produced was 0.83 dl/g when measured in a concentration of 0.4 g of the polybenzimidazole in 100 ml of 97 percent sulfuric acid at 25° C. The weight average molecular weight and molecular weight distribution were 165,000 and 3.04, respectively.

E.

The procedure of Run A was repeated except that after heating the reaction mixture to its melting temperature the polymerization temperature was raised to 400° C. and held at that temperature for one hour, and the amount of catalyst was 0.2 grams. The inherent viscosity of the polybenzimidazole thus produced was 0.58 dl/g when measured in a concentration of 0.4 g of the polybenzimidazole in 100 ml of 97 percent sulfuric acid at 25° C.

F.

The procedure of Run E was repeated except that the amount of catalyst was 0.4 gram. The inherent viscosity of the polybenzimidazole thus produced was 0.70 dl/g when measured in a concentration of 0.4 g of the polybenzimidazole in 100 ml of 97 percent sulfuric acid at 25° C.

G.

The procedure of Run E was repeated except that the amount of catalyst was 0.8 gram. The inherent viscosity of the polybenzimidazole thus produced was 0.71 dl/g when measured in a concentration of 0.4 g of the polybenzimidazole in 100 ml of 97 percent sulfuric acid at 25° C. The weight average molecular weight and molecular weight distribution were 132,000 and 2.65, respectively.

H.

The procedure of Run E was repeated except that the amount of catalyst was 1.2 grams. The inherent viscosity of the polybenzimidazole thus produced was 0.74 dl/g when measured in a concentration of 0.4 g of the polybenzimidazole in 100 ml of 97 percent sulfuric acid at 25° C. The weight average molecular weight and molecular weight distribution were 139,000 and 2.64, respectively.

I.

The procedure of Run E was repeated except that the catalyst was eliminated as a control. The inherent viscosity of the polybenzimidazole thus produced was 0.45 dl/g when measured in a concentration of 0.4 g of the polybenzimidazole in 100 ml of 97 percent sulfuric acid at 25° C.

EXAMPLE II

A.

Into a 3-necked flask equipped with a nitrogen inlet and outlet, mechanical stirrer, and a condenser were placed 56.35 g (0.263 moles) of 3,3',4,4'-tetraaminobiphenyl, 43.69 g (0.263 moles) of isophthalic acid, and 0.4 g phenyldichlorophosphine. The flask was degassed and then filled with nitrogen. The mixture was heated rapidly with stirring for a period of approximately one hour to a temperature (i.e., 400° C.) as designated in the specific runs. A 17 ml quantity of water was collected. The temperature of the reaction mixture was maintained at 400° C. for another hour.

The resulting product was cooled to room temperature to provide a quantitative yield of the polybenzimidazole. The polybenzimidazole exhibited an inherent viscosity of 0.77 dl/g when measured in a concentration of 0.4 g of the polybenzimidazole in 100 ml of 97 percent sulfuric acid.

B.

The procedure of Run A was repeated except that the amount of phenyldichlorophosphine was 0.6 gram. The inherent viscosity of the polybenzimidazole thus produced was 0.82 dl/g when measured in a concentration of 0.4 g of the polybenzimidazole in 100 ml of 97 percent sulfuric acid at 25° C. The weight average molecular weight and molecular weight distribution were 147,000 and 2.78, respectively. The polymer was completely soluble in dimethylacetamide containing 2% lithium chloride.

C.

The procedure of Run A was repeated except that the amount of phenyldichlorophosphine was 0.8 gram. The inherent viscosity of the polybenzimidazole thus produced was 0.79 dl/g when measured in a concentration of 0.4 g of the polybenzimidazole in 100 ml of 97 percent sulfuric acid at 25° C. The weight average molecular weight and molecular weight distribution were 122,000 and 2.73, respectively. The polymer was completely soluble in dimethylacetamide.

D.

The procedure of Run A was repeated except that the amount of phenyldichlorophosphine was 1.2 grams. The inherent viscosity of the polybenzimidazole thus produced was 0.86 dl/g when measured in a concentration of 0.4 g of the polybenzimidazole in 100 ml of 97 percent sulfuric acid at 25° C.

E.

The procedure of Run A was repeated except that after heating the reaction mixture to the melting temperature of the mixture the polymerization temperature was raised to 390° C. and held at that temperature for 1 hour, and the amount of phenyldichlorophosphine was 0.6 gram. The inherent viscosity of the polybenzimidazole thus produced was 0.76 dl/g when measured in a concentration of 0.4 g of the polybenzimidazole in 100 ml of 97 percent sulfuric acid at 25° C.

F.

The procedure of Run A was repeated except that after heating the reaction mixture to the melting temperature of the mixture the polymerization temperature was raised to 430° C. and held at that temperature for one hour, and the amount of phenyldichlorophosphine was 0.4 gram. The inherent viscosity of the polybenzimidazole thus produced was 1.10 dl/g when measured in a concentration of 0.4 g of the polybenzimidazole in 100 ml of 97 percent sulfuric acid at 25° C.

G.

The procedure of Run A was repeated except that a mixture of 0.3 gram of phenyldichlorophosphine and 0.3 gram of triphenylphosphite was employed. The inherent viscosity of the polybenzimidazole thus produced was 0.68 dl/g when measured in a concentration of 0.4 g of the polybenzimidazole in 100 ml of 97 percent sulfuric acid at 25° C.

EXAMPLE III

A.

Into a three-necked flask equipped with a nitrogen inlet and outlet, mechanical stirrer and a condenser were placed 56.35 g (0.263 moles) of 3,3',4,4'-tetraaminobiphenyl, 43.69 g (0.263 moles) of isophthalic acid and 0.6 g of diphenylphosphine oxide. The flask was degassed and then filled with nitrogen. The mixture was heated rapidly with stirring for a period of approximately one hour to a temperature (i.e., 400° C.) as designated in the specific runs. A 17 ml quantity of water was collected. The temperature of the reaction mixture was maintained at 400° C. for another hour.

The resulting product was cooled to room temperature to provide a quantitative yield of the polybenzimidazole. The polybenzimidazole exhibited an inherent viscosity of 0.8 dl/g when measured in a concentration of 0.4 g of the polybenzimidazole in 100 ml of 97 percent sulfuric acid. The weight average molecular weight was 113,000 with a molecular weight distribution of 2.32. The polymer was completely soluble in dimethylacetamide containing 2 percent lithium chloride.

B.

The procedure of Run A was repeated except that di(methoxy)phenylphosphine was employed as the catalyst. The inherent viscosity of the polybenzimidazole thus produced was 0.75 dl/g when measured in a concentration of 0.4 g of the polybenzimidazole in 100 ml of 97 percent sulfuric acid at 25° C. The polymer exhibited a weight average molecular weight of 118,858 and a molecular weight distribution of 2.50.

C.

The procedure of Run A was repeated except that di(butoxy)phenylphosphine was employed as the catalyst. The inherent viscosity of the polybenzimidazole thus produced was 0.70 dl/g when measured in a concentration of 0.4 g of the polybenzimidazole in 100 ml of 97 percent sulfuric acid at 25° C. The polymer exhibited a weight average molecular weight of 99,996 and a molecular weight distribution of 2.34.

D.

The procedure of Run A was repeated except that diphenylphosphine was employed as the catalyst. The inherent viscosity of the polybenzimidazole thus produced was 0.69 dl/g when measured in a concentration of 0.4 g of the polybenzimidazole in 100 ml of 97 percent sulfuric acid at 25° C. The polymer exhibited a weight average molecular weight of 103,110 and a molecular weight distribution of 2.29.

E.

The procedure of Run A was repeated except that the catalyst tri(p-methoxyphenyl)phosphine was used. The inherent viscosity of the polybenzimidazole thus produced was 0.62 dl/g when measured in a concentration of 0.4 g of the polybenzimidazole thus produced was 0.62 dl/g when measured in a concentration of 0.4 g of the polybenzimidazole in 100 ml of 97 percent sulfuric acid at 25° C. The polymer exhibited a weight average molecular weight of 99,738 and a molecular weight distribution of 2.44.

F.

The procedure of Run A was repeated except that the catalyst triphenylphosphate was used. The inherent viscosity of the polybenzimidazole thus produced was 0.74 dl/g when measured in a concentration of 0.4 g of the polybenzimidazole in 100 ml of 97 percent sulfuric acid at 25° C. The polymer exhibited a weight average molecular weight of 118,882 and a molecular weight distribution of 2.32.

G.

The procedure of Run A was repeated except that the catalyst tributylphosphite was used. The inherent viscosity of the polybenzimidazole thus produced was 0.61 dl/g when measured in a concentration of 0.4 g of the polybenzimidazole in 100 ml of 97 percent sulfuric acid at 25° C. The polymer exhibited a weight average molecular weight of 90,792 and a molecular weight distribution of 2.40.

H.

The procedure of Run A was repeated except that the catalyst o-phenylenephosphochloridite was used. The inherent viscosity of the polybenzimidazole thus produced was 0.71 dl/g when measured in a concentration of 0.4 g of the polybenzimidazole in 100 ml of 97 percent sulfuric acid at 25° C. The polymer exhibited a weight average molecular weight of 118,100 and a molecular weight distribution of 2.60.

I.

The procedure of Run A was repeated except that the catalyst o-phenylenephosphochloridate was used. The inherent viscosity of the polybenzimidazole thus produced was 0.69 dl/g when measured in a concentration of 0.4 g of the polybenzimidazole in 100 ml of 97 percent sulfuric acid at 25° C. The polymer exhibited a weight average molecular weight of 105,682 and a molecular weight distribution of 2.51.

J.

The procedure of Run A was repeated except that the catalyst phenyl-N-phenylphosphoramidochloridate was used. The inherent viscosity of the polybenzimidazole thus produced was 0.72 dl/g when measured in a concentration of 0.4 g of the polybenzimidazole in 100 ml of 97 percent sulfuric acid at 25° C. The polymer exhibited a weight average molecular weight of 109,109 and a molecular weight distribution of 2.40.

K.

The procedure of Example IIA was employed except that after heating the reaction mixture to the melting temperature of the mixture the polymerization temperature was raised to 360° C. and held at that temperature for one hour, and a mixture of 0.6 g of phenyldichlorophosphine and 0.2 g of triphenylphosphite was used. The inherent viscosity of the polybenzimidazole thus produced was 0.51 dl/g when measured in a concentration of 0.4 g of the polybenzimidazole in 100 ml of 97 percent sulfuric acid at 25° C. The weight average molecular weight and molecular weight distribution were 65,000 and 2.36, respectively. The polymer was completely soluble in dimethylacetamide (2 percent LiCl).

L.

The procedure of Example IIA was employed except that after heating the reaction mixture to its melting temperature the polymerization temperature was raised to 380° C. and held at that temperature for one hour, and a mixture of 0.6 g of phenyldichlorophosphine and 0.2 g of triphenylphosphite was used. The inherent viscosity of the polybenzimidazole thus produced was 0.70 dl/g when measured in a concentration of 0.4 g of the polybenzimidazole in 100 ml of 97 percent sulfuric acid at 25° C. The weight average molecular weight and molecular weight distribution were 109,000 and 2.42, respectively. The polymer was completely soluble in dimethylacetamide (2 percent LiCl).

M.

The procedure of Example IIA was employed except that after heating the reaction mixture to its melting temperature the polymerization temperature was raised to 390° C. and held at that temperature for one hour, and a mixture of 0.6 g of phenyldichlorophosphine and 0.2 g of triphenylphosphite was used. The inherent viscosity of the polybenzimidazole thus produced was 0.80 dl/g when measured in a concentration of 0.4 g of the polybenzimidazole in 100 ml of 97 percent sulfuric acid at 25° C. The weight average molecular weight and molecular weight distribution were 134,000 and 2.69, respectively. The polymer was completely soluble in dimethylacetamide (2 percent LiCl).

N.

The procedure of Example IIA was employed except that after heating the reaction mixture to its melting temperature the polymerization temperature was raised to 400° C. and held at that temperature for one hour, and a mixture of 0.6 g of phenyldichlorophosphine and 0.2 g of triphenylphosphite was used. The inherent viscosity of the polybenzimidazole thus produced was 0.86 dl/g when measured in a concentration of 0.4 g of the polybenzimidazole in 100 ml of 97 percent sulfuric acid at 25° C. The weight average molecular weight and molecular weight distribution were 164,000 and 3.41, respectively. The polymer was completely soluble in dimethylacetamide (2 percent LiCl).

EXAMPLE IV 3,3',4,4'-Tetraaminobiphenyl and isophthalic acid were reacted for one hour in the presence of phenyldichlorophosphine/triphenylphosphite catalyst* at various temperature levels as in Example III to yield polybenzimidazole polymers having the following indicated viscosities, molecular weights and plugging values:

| T, °C. | I.V. dl/g | $\overline{Mn}$ | $\overline{Mw}$ | MWD | P.V. g/cm$^2$ |
|---|---|---|---|---|---|
| 360 | 0.51 | 27,600 | 65,000 | 2.36 | >5 |
| 380 | 0.70 | 44,200 | 109,000 | 2.42 | >5 |
| 390 | 0.80 | 49,700 | 134,000 | 2.69 | 3.15 |
| 400 | 0.86 | 48,100 | 164,000 | 3.41 | 0.61 |

*1.5% Phenyldichlorophosphine and 0.50% triphenylphosphite based on the weight of isophthalic acid.

What is claimed is:

1. A single stage melt polymerization process for the production of high molecular weight polybenzimidazole which comprises polymerizing at least one monomeric aromatic compound having a pair of amine substituents in an ortho position relative to each other and a carboxylic acid group positioned on an aromatic nucleus, by heating the monomeric compound above its melting temperature in contact with a phosphorus-containing polymerization catalyst corresponding to the formula:

where R is a radical selected from organic, halide or hydrogen substituents, with the proviso that not more than one R is hydrogen; and Y is an oxygen atom, and n is the integer zero or one.

2. A process in accordance with claim 1 wherein the monomeric aromatic compound is 4-carboxy-3',4'-diaminodiphenyl ether.

* * * * *